Feb. 11, 1936.  L. C. HUCK  2,030,170
RIVET
Filed June 7, 1932
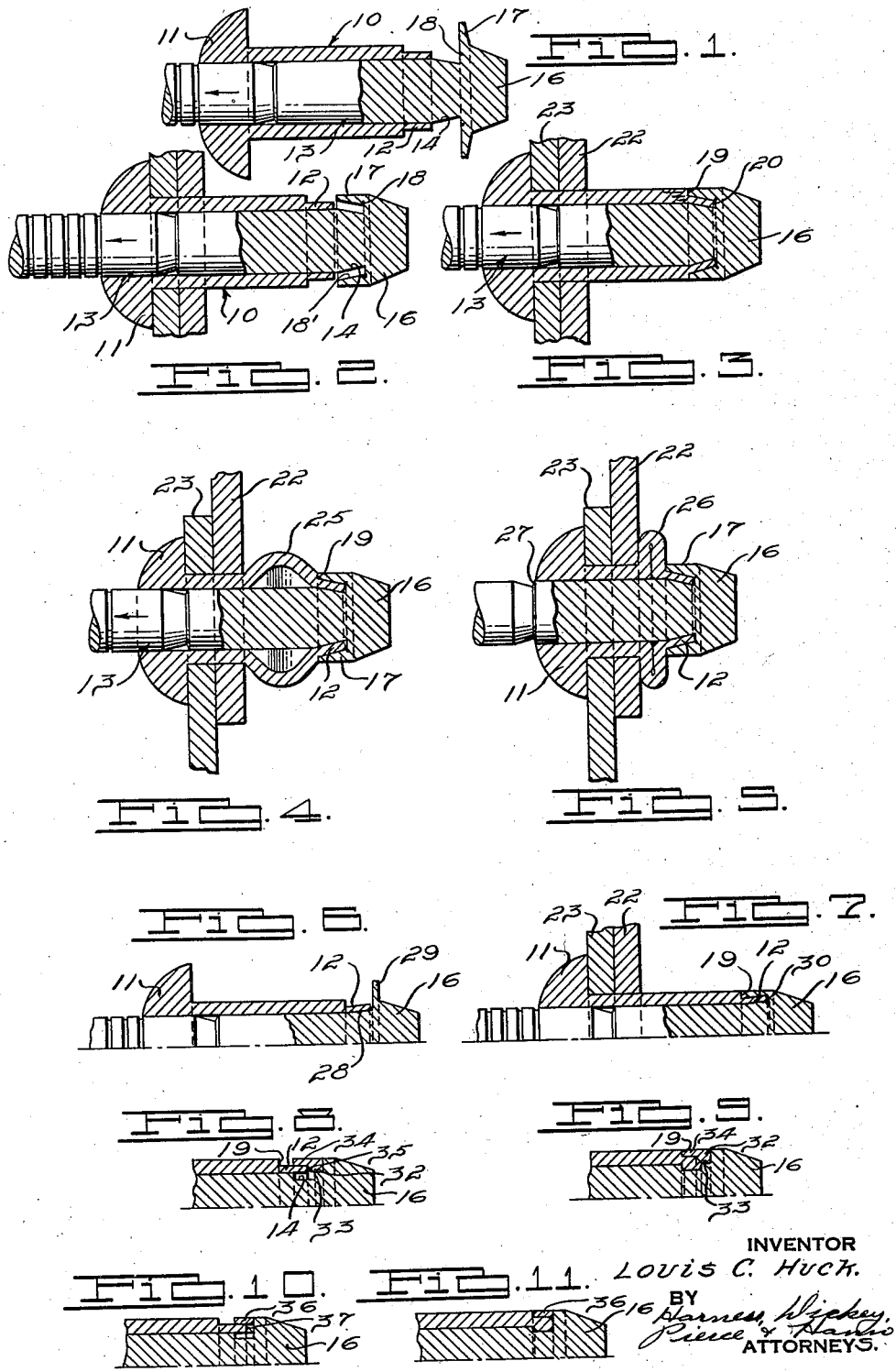
INVENTOR
Louis C. Huck.
BY
ATTORNEYS.

Patented Feb. 11, 1936

2,030,170

UNITED STATES PATENT OFFICE 2,030,170

RIVET

Louis C. Huck, Grosse Pointe, Mich., assignor to Huxon Holding Corporation, Detroit, Mich., a corporation of Michigan Application June 7, 1932, Serial No. 615,854

25 Claims. (Cl. 85—40)

The invention relates to rivets and it has particular relation to a rivet construction and a method of manufacturing the same.

In certain respects the invention is related to my copending applications for patent, Serial No. 545,004, filed June 17, 1931; Serial No. 578,314, filed December 1, 1931 and the co-pending application for patent of Ralph A. Miller, Serial Number 559,826, filed August 28, 1931.

In general, a rivet of the general type disclosed in such applications for patent and involved in the present invention, comprises a tubular or female member and a male member, which extends through the female member. This shank has a head at one end engaging one end of the female member and the diameter of such head when the rivet is to be set or used for securing structural elements together, is not greater than the maximum diameter of the tubular body portion of the female member. It follows that the assembly may be inserted through structural openings from one side of the structure only, it being understood that the end of the assembly having the shank head, will be inserted first.

Preferably, that end of the female member opposite the head on the male member has an initially formed head thereon for engaging the outer or working side of the structure, although it is possible to form the head during the rivet setting operation, and the male member projects outwardly beyond this head. Then by pulling the male member and applying the reactionary force to the head or outer end of the female member, the head on the male member causes deformation of inner end of the female member to provide a head at the inner side of the structure.

One object of the present invention is to provide a rivet construction comprising a tubular female member and a male member extending therethrough, in which such members will be locked together in a positive manner during the rivet assembling operation, to provide a positive lock for preventing any relative axial movement of the members after the rivet has been set or used for securing structural elements together.

Another object of the invention is to provide a rivet of the general type designated, in which the inner end of the female member is reinforced against bursting during the rivet setting operation, in an improved and positive manner.

Another object of the invention is to provide a rivet of the last mentioned character, in which such inner end of the female member is reinforced against bursting in a positive manner by the head on the male member.

Another object of the invention is to provide an improved method of manufacturing and assembling male and female rivet members, in which, as finally assembled, the male member has a head so related to parts of the female member, that the outer fibers of the latter will be stressed to a greater extent than the inner fibers during the rivet setting operation.

Another object of the invention is to provide an improved method of manufacturing and assembling male and female rivet members so as to obtain a unitary and interlocked assembly prior to any rivet setting operation.

Another object of the invention is to provide a rivet comprising a male and female member in which the male member has a head so constructed and related to the adjacent end of the female member, that the parts may be initially locked together prior to any rivet setting operation, and during the rivet setting operation, the head on the male member will efficiently and in an improved manner apply greater stress to the outer fibers of the female member than to the inner fibers thereof so that bulbing of the female member intermediate its ends may be effected in a substantially predetermined manner.

Other objects of the invention will become apparent from the following description, the drawing relating thereto, and the claims hereinafter set forth.

For a better understanding of the invention reference may be had to the accompanying drawing, forming a part of the specification wherein:

Figure 1 is a longitudinal cross-sectional view of a rivet assembly, comprising a male and female member as assembled following the manufacture of each member separately;

Fig. 2 is a view similar to Fig. 1, but illustrating the manner in which a flange on the male member is turned into a substantially axial position.

Fig. 3 is a similar view showing the male and female members as related before or during the initial phase of rivet setting operation.

Fig. 4 is a cross-sectional view illustrating substantially the condition of the rivet during an intermediate stage of the rivet setting operation;

Fig. 5 substantially illustrates the rivet after it has been set and used for securing structural elements together;

Fig. 6 is a fragmentary, longitudinal cross-sectional view, similar to that shown by Fig. 1, and wherein the male and female members are constructed according to another form of the invention;

Fig. 7 is a view similar to Fig. 3 but illustrating the manner in which such male and female members are locked together prior to any rivet setting operation.

Fig. 8 is a fragmentary cross-sectional view of a rivet constructed to another form of the invention, wherein a separate collar is employed.

Fig. 9 illustrates the manner the parts are associated together prior to or at the beginning of the rivet setting operation.

Fig. 10 is a view similar to Fig. 8, but illustrating another form of collar arrangement.

Fig. 11 illustrates the manner in which the parts shown by Fig. 10 are associated prior to or during the initial phase of the rivet setting operation.

Referring to Figs. 1, 2 and 3, a tubular metal female member 10 is provided having a head 11 at one end, and at its opposite end, a portion 12 of reduced outer diameter. A male rivet member 13 of relatively harder metal is also provided which extends through the female member and beyond the head 11 at one end, while at its opposite end it has a reduced portion 14 of conical shape for example which may have slightly greater axial length than the portion 12 and the reason for this variation will presently be set forth. Beyond the conically shaped portion 14 and at its extreme end, the male member has a head 16 which initially is provided with an annular flange 17 considerably larger in outside diameter than the body portion of the female member.

Preferably the inner face of the head 16 at the junction of flange 17, and substantially in axial alignment with the outer surface of the body of the male member, has an annular groove 18 to facilitate spinning or turning of the flange into a substantially axial position. The parts may be assembled as shown in Fig. 1 and then the flange 17 may be turned or spun over as shown in Fig. 2, or if desired the parts may be axially related as shown in Fig. 3 before spinning or turning of the flange. Such flange and groove are so constructed and related that when the flange is so turned or spun, it may have its then inner surface indicated at 18' substantially parallel to the taper of groove 14. If the parts are first axially related as shown in Fig. 3, the reduced portion 12 may be squeezed into groove 14 first and the flange is then turned axially thereover. In either case the reduced portion 12 will be contracted into substantially full contact with the tapered base of the groove 14 and this will result in axial interlocking of the male and female members in the region of the groove. If the parts are assembled as shown in Fig. 2, movement of the reduced portion 12 of the female member into the space between surface 18' of flange 17 and the base of groove 14 may be effected during the initial phase of the rivet setting operation, during which, as previously explained, the male member will be pulled in the direction of the arrow shown in Fig. 2, and the reactionary force will be applied to head 11 of the female member. In either case, before the rivet begins to set as shown in Fig. 4, the female and male members will be interlocked as shown in Fig. 3. Preferably the axial length of flange 17 and reduced portion 12 are such, that as shown in Fig. 3, a space 20 will be provided with the inner end of the flange 17 engaging the shoulder, indicated at 19 on the female member.

It should be understood that in setting a rivet of this character, the end of the male member 13 projecting outwardly from the head 11 on the female member is pulled and the reactionary force of such pull is applied against the head 11 to hold it against the structure. A machine which may be used for this purpose is disclosed in the application for patent of L. C. Huck and Ralph A. Miller, Serial Number 560,289, filed August 31, 1931. When the male member is so pulled and the reactionary force to the pull is applied against the head 11, it is apparent that the head 16 on the male member will be urged against the end of the female member according to the force of the pull. It is also evident that, the turned in annular flange portion 17 of the head 16 engaging the shoulder 19 on the female member will subject the outer fibers of the latter to a greater stress than the inner fibers, as illustrated by the arrows in Fig. 2 for example, it being understood that the space 20 between the end of the reduced portion 12 on the female member and the head, permits the transmission of such force to the shoulder 19 without engagement of the end face of the reduced portion 12.

Application of the force of the head 16 against the shoulder 19 thereby stressing the outer fibers of the female member more than the inner fibers, also causes a resultant of force application to the female member which is directed slightly toward the rivet axis, in the general direction of pull. As pull is continued on the male member, the body portion of the female member bulbs outwardly as indicated at 25 in Fig. 3 and upon continued movement of the male member the bulb finally forms into a head as indicated at 26 in Fig. 4. The application of greater stress to the outer fibers of the female member and/or directing the bulbing force at a slight angle to the axis of the rivet, as previously described, seemingly causes the largest diameter of bulbing shown in Fig. 3 to be nearer the structure than to shoulder 19. Formation of the bulb in this manner is preferred, as a better head is formed and the structural elements 22 and 23 are more tightly drawn together when the rivet is finally set.

After the rivet is finally set, it is apparent that the locking engagement positively holds the female and male members together against relative axial movement. It may be stated here that preferably the male member is provided with a neck or undercut as indicated at 27 in Fig. 4 and after the rivet is set continued pull on the male member will tension it sufficiently to break it at this undercut or neck to leave the end of the male member substantially flush with the outer surface of the head 11.

The dimensions of and metal used in the tubular body of the female member between head 11 and shoulder 19, and the dimensions of and metal used in the male body, may substantially correspond to characteristics of similar parts of the male and female members disclosed in my copending application for patent relating to rivets, Serial No. 599,868, filed March 19, 1932, so that a globular type of head will be formed, and the rivet connection will be water and air tight after it is set.

It is evident that the flange portion of the head 16, surrounding the reduced portion 12 of the female member, reinforces the end of the latter, and considerably increases the bursting strength of such end of the female member. Particularly this is true of the male member which is composed of metal less ductile than the female member, and normally the metals will have this relation. Attention is directed to the fact that the bursting strength of the end of the female member, therefore, may be increased without increasing the diameter of the inner end of the assembly beyond the maximum diameter of the body portion of the female member, so that the assembly may be inserted through openings in a structure from one side only. Moreover, it will be apparent that this increase in bursting strength, and the locking of the male and female parts together, are obtained, while still allowing the application of greater stress to the outer metal fibers of the female member, and direction of force application at an angle to the rivet axis. All of these factors facilitate proper bulbing of the female member, so that a tight and strong connection between structural elements will be secured.

The construction shown by Fig. 6 is similar to that shown by Fig. 1 with the exception that the male member adjacent the head 16 has an oppositely tapered conical surface portion 28. The female member similarly has a reduced portion 12 but this tapers outwardly substantially complementary to the conical portion 28 of the male member. The members may be assembled substantially as previously described and a flange 29 on the head 16 turned over into a substantially axial position. Finally the parts either before riveting or during the initial phase thereof have the relation shown by Fig. 7 and it will be noted that a recess 30 is provided between the end face of the reduced portion 12 and the head 16 and that the flange 29 engages the shoulder 19 on the female member to cause the application of greater stress to the outer fibers than to the inner fibers and direction of force at a slight angle toward the rivet axis. The reduced portion 12, the position thereof between the flange 29 on the head and the tapered portion 28 of the male member insures locking engagement of the male and female members after the rivet is set. It should be understood that in this construction, as in the first assembly, the head flange also increases the bursting strength of the inner end of the female member. As stated previously, these several factors facilitate proper bulbing of the female members.

In the construction shown by Figs. 8 and 9, the female member has a reduced portion 12, and the male member has a groove 14, but this groove preferably is spaced slightly from head 16 to provide a shoulder 33. Before assembling, a ring 34, of relatively hard metal as compared to the metal of which the female member is composed, is disposed around the male member and has an inwardly directed rib 32 disposed around shoulder 33, and an axial portion 34 around groove 14, but spaced radially therefrom. It will be noted that on its inner face a tapered surface 35 is provided on the ring, and outside dimensions of the ring are such that the assembly may be inserted through openings in the structure to be riveted. Either before or during the rivet setting operation, the male member may be pulled while applying the reactionary force to the female head, and this causes the reduced portion 12 to be forced along tapered surface 35 and into the groove 14 as shown in Fig. 9. The dimensions of the parts preferably is such that after this operation, the end face of portion 12 in groove 14 will not engage at least entirely the head or collar to such extent that the collar will not, during setting of the rivet, apply greater stress to the shoulder 19. In this construction, like those previously described, the end of the female member is reinforced against bursting, the parts are desirably locked together axially in the region of groove 14, and the ring 33 applies greater outer fiber stress to the female member through shoulder 19 and a resultant of the forces may be at a slight angle to the rivet axis.

The construction shown by Figs. 10 and 11 is similar to that shown by Figs. 8 and 9, but the ring indicated at 36, is cylindrical and the groove 14 extends all the way to head 16. Preferably, the reduced portion 12 of the female member is outwardly tapered as indicated at 37, to facilitate turning such portion into the groove. Similar reinforcement of the female member, stress application to shoulder 19, direction of resultant force application and interlocking of the parts may be obtained in this construction.

While in all constructions shown, a space between the end of the reduced portion 12 of the female member and the head on the male member or ring thereon, as the case may be, has been considered desirable for reasons mentioned, the absence of this space would not prevent using the rivet efficiently. The obtaining of the outer fiber stress and angled force direction seem desirable in obtaining certain characteristics of bulbing.

Rivets of the types described may be manufactured inexpensively, and may be employed for securing structural elements together rapidly and positively. It is apparent that improved means are provided for the application of greater stress to the outer fibers of the bulbing portion of the female member than to the inner fibers, and for causing the resultant of such forces applied to the female member, to be directed at an angle slightly toward the axis of the rivet. It is evident that in either construction described and illustrated that the male and female members, are locked together positively against any substantial relative axial movement after the rivet is set, although during the setting of the rivet, the locking feature only prevents relative axial movement of those parts of the male and female members in the region of such head on the male member. It should also be clear, that the head on the male member, through its flange, increases the bursting strength of the end of the female member, and this is desirable if the intermediate portion of the latter is to bulb without rupturing or otherwise undesirably deforming the inner end of such member. It has been indicated that the male member preferably comprises material less ductile than the female member, and various combinations of metals may be employed such as described in the previously identified applications for patent.

Although more than one form of the invention has been described and illustrated in detail, it will be apparent to those skilled in the art that various modifications may be made without departing from the scope of the appended claims.

I claim:

1. The method of manufacturing a rivet, which comprises forming a member with a tubular portion, forming a shank for extending into the tubular portion, forming an enlarged head on the shank, assembling the members, and prior to riveting flanging a part of the head over an end of the tubular member, to provide a substantial, axially directed, interlocking arrangement.

2. The method of manufacturing a rivet, which comprises forming a member with a tubular portion, forming a shank for extending into the tubular portion, forming an enlarged head on the shank, with a rim extending axially of the shank, assembling the members, and then prior to riveting telescoping the rim axially over an end of the tubular portion, to provide a substantial, axially-directed, interlocking arrangement.

3. The method of riveting, which comprises forming a member with a tubular portion, forming a second member for extending into the tubular portion, forming an annular surface recess in a part of one member, assembling the parts, deforming a part of the second member into outer telescoping relation to the end of the tubular portion, and deforming a part of the member not having the recess radially into the recess.

4. The method of manufacturing a rivet, which comprises forming a tubular member, forming a second member for extending through the tubular member, forming an axially directed groove in the second member bounded by axial, radially spaced walls, assembling the members, and then prior to riveting, axially telescoping the first member into such groove to lock the parts together.

5. The method of manufacturing a rivet, which comprises forming a tubular member, forming a shank member for extending through the tubular member, providing such shank member with an enlarged head for engaging one end of the tubular member, assembling the members, and then deforming a part of such head over the outer peripheral surface of the end portion of the tubular member.

6. The method of manufacturing a rivet, which comprises forming a tubular member, forming a shank member, for extending through the tubular member, providing an enlarged head on one end of the shank for engaging one end of the tubular member, providing a flange on such head, assembling the members, and then turning said flange over the outer surface of the end of the tubular member.

7. The method of manufacturing a rivet, which comprises forming a tubular member with an end portion of reduced diameter, forming a shank member for extending through the members, providing a flange on the shank member, assembling the members so that the flange is adjacent the tubular member portion of reduced diameter, and then turning the flange over and against such reduced portion of the tubular member.

8. An article of manufacture comprising a tubular rivet member, a shank extending through such member, and a flange on said shank extending axially over an outer surface portion of one end of the member, said flange having an outer diameter not greater than the maximum outer diameter of the tubular member body portion.

9. A rivet comprising a tubular member having an end portion of reduced outer diameter defining a shoulder at its inner extent, a shank member extending through such tubular member, and a head on such shank having a portion extending axially over an end of such tubular portion of reduced outer diameter and engaging the shoulder at the inner end of such portion of reduced diameter.

10. A rivet comprising a tubular member having an end portion of reduced outer diameter defining a shoulder at its inner extent, a shank member extending through such tubular member, and a head on such shank having a portion extending axially over an end of such tubular portion of reduced outer diameter and engaging the shoulder at the inner end of such portion of reduced diameter, the outer end face of such reduced portion being free of engagement with such head.

11. A rivet comprising a tubular member having a portion of reduced outer diameter at one end thereof, thereby providing a shoulder at the inner end of such reduced portion, a shank extending through the tubular member, a head on the shank at that end of the tubular member having the reduced portion, and means on such head for engaging said shoulder, to apply a stress to outer fibers of the tubular member, greater than any stress applied to inner fibers thereof, when the shank is pulled through the female member to urge the head against the end portion of the latter.

12. A rivet comprising a tubular member having a portion of reduced outer diameter at one end thereof, thereby providing a shoulder at the inner end of such reduced portion, a shank extending through the tubular member, a head on the shank at that end of the tubular member having the reduced portion, and means on such head for engaging said shoulder, to apply a stress to outer fibers of the tubular member, greater than any stress applied to inner fibers thereof, when the shank is pulled through the female member to urge the head against the end portion of the latter, said portion of reduced outer diameter on the tubular member, being axially tapered and the shank having a similarly tapered surface substantially contacting therewith.

13. A rivet comprising a tubular member, a shank member extending through the tubular member and having a head for engaging one end portion of the tubular member, and means on said head and on the end of the tubular member for applying a greater stress to the outer fibers of the tubular member when the shank is pulled through the latter in such manner that the head is urged against the end portion of the tubular member, said means comprising an annular portion on such head surrounding an end portion of the tubular member and engaging a shoulder on and spaced from the end of such tubular member.

14. A rivet comprising a tubular member having an end portion of reduced outer diameter and a shoulder at the inner end of such portion, a shank extending through the tubular member and having a head at that end of the latter adjacent the end of the reduced portion thereon, and means on said head for engaging such shoulder without engaging the end face of the reduced portion.

15. A rivet comprising a tubular member having an end portion of reduced outer diameter and a shoulder at the inner end of such portion, a shank extending through the tubular member and having a head at that end of the latter adjacent the end of the reduced portion thereon, and means on said head for engaging such shoulder without engaging the end face of the reduced portion, said means comprising an annular portion on the head, between which and the shank body, the reduced portion telescopically projects.

16. A rivet comprising a tubular member having an end portion of reduced outer diameter and a shoulder at the inner end of such portion, a shank extending through the tubular member and having a head at that end of the latter adjacent the end of the reduced portion thereon, and means on said head for engaging such shoulder without engaging the end face of the reduced portion, said means comprising an annular portion on the head, between which and the shank body, the reduced portion telescopically projects, the outer maximum diameter of such annular portion and head on the shank substantially corresponding to the outer diameter of the unreduced portion of the female member.

17. A rivet as an article of manufacture which is adapted to be inserted and set from one side of a structure to be riveted, comprising a tubular rivet member and a shank member extending through the tubular member and having a portion embracing an end portion of such tubular member and locking the members together, the dimensions of such embracing portion being such as to permit initial insertion thereof through the opening in the structure to be riveted.

18. A rivet as an article of manufacture which is adapted to be inserted and set from one side of a structure to be riveted, comprising a tubular member, a shank member extending through the tubular member, a head on one end of the shank beyond the adjacent end of the tubular member, and a separate ring between the head and such end of the tubular member, the rivet being adapted for application by pulling the opposite end of the shank and applying the reactionary force to the end of the tubular member adjacent such end of the shank so as to cause the tubular member to expand or bulb intermediate its ends into a head, said ring having a tapered end face adjacent the end of the tubular member for engaging the latter.

19. A rivet as an article of manufacture which is adapted to be inserted and set from one side of a structure to be riveted, comprising a tubular member, a shank member extending through the tubular member, a head on one end of the shank beyond the adjacent end of the tubular member, and a separate ring between the head and such end of the tubular member, the rivet being adapted for application by pulling the opposite end of the shank and applying the reactionary force to the end of the tubular member adjacent such end of the shank so as to cause the tubular member to expand or bulb intermediate its ends into a head, said ring being constructed of metal which is relatively hard as compared to the metal in the tubular member.

20. A rivet as an article of manufacture which is adapted to be inserted and set from one side of a structure to be riveted, comprising a tubular member, a shank member extending through the tubular member, a head on one end of the shank beyond the adjacent end of the tubular member, and a separate ring between the head and such end of the tubular member, the rivet being adapted for application by pulling the opposite end of the shank and applying the reactionary force to the end of the tubular member adjacent such end of the shank so as to cause the tubular member to expand or bulb intermediate its ends into a head, said ring having localized engagement with the end of the tubular member adjacent the outer periphery of the latter.

21. A rivet as an article of manufacture which is adapted to be inserted and set from one side of a structure to be riveted, comprising a tubular member, a shank member extending through the tubular member, a head on one end of the shank beyond the adjacent end of the tubular member, and a separate ring between the head and such end of the tubular member, the rivet being adapted for application by pulling the opposite end of the shank and applying the reactionary force to the end of the tubular member adjacent such end of the shank so as to cause the tubular member to expand or bulb intermediate its ends into a head, said ring having a portion to prevent movement of the head into the end of the tubular member when the shank is pulled.

22. A rivet as an article of manufacture which is adapted to be inserted and set from one side of a structure to be riveted, comprising a tubular member adapted to extend through the structure and having an end portion adapted to project beyond one side thereof, a shank member extending through the tubular member, and means positively locking one end of the shank to said tubular portion adjacent the free end of the latter so as to substantially prevent relative axial movement of the locked portions in either direction, the rivet being adapted for setting by movement of the shank through the tubular member in a direction towards the other end of the pin and holding the end of the tubular member opposite the said end portion against movement in the same direction.

23. The method of manufacturing a rivet, which comprises forming a tubular member, forming a shank for extending through the tubular member, forming a surface recess in a part of one member, assembling the members, and prior to any rivet setting operation, radially deforming the member not having said recess, into the recess to lock parts of the members together against substantially axial movement in a relative manner.

24. The method of manufacturing a rivet, which comprises forming a tubular member, forming a shank for extending through the tubular member, forming an annular surface recess in a part of one member, assembling the members, and then prior to any rivet setting operation radially deforming such member not having the recess, into the latter to lock parts of the members against relative axial movement.

25. The method of manufacturing a rivet, which comprises forming a tubular member, forming a shank for extending through the tubular member, forming a surface recess in the end portion of one member, assembling the members, and then prior to any rivet setting operation, deforming a part of the other member into such recess to lock the parts together.

LOUIS C. HUCK.

DISCLAIMER 2,030,170.—*Louis C. Huck*, Grosse Pointe, Mich. Rivet. Patent dated February 11, 1936. Disclaimer filed September 2, 1941, by the assignee, *Huxon Holding Corporation*.

Hereby enters this disclaimer to claim 8 in said patent.

[*Official Gazette September 30, 1941.*]